(12) United States Patent
Fuchs et al.

(10) Patent No.: US 8,295,427 B1
(45) Date of Patent: Oct. 23, 2012

(54) CONTROL ROD FOR A PRESSURIZED WATER NUCLEAR REACTOR

(75) Inventors: Hans-Peter Fuchs, Nürnberg (DE); Florian Schebitz, Erlangen (DE); Peter Dewes, Erlangen (DE); Günter Fischer, Fürth (DE); Alfons Roppelt, Forchheim (DE); Winfried Beck, Frensdorf (DE)

(73) Assignee: Areva NP GmbH, Erlangen (DE)

( * ) Notice: Subject to any disclaimer, the term of this patent is extended or adjusted under 35 U.S.C. 154(b) by 684 days.

(21) Appl. No.: 12/021,648

(22) Filed: Jan. 29, 2008

Related U.S. Application Data

(63) Continuation of application No. PCT/EP2006/007225, filed on Jul. 22, 2006.

(30) Foreign Application Priority Data

Jul. 29, 2005 (DE) .......................... 10 2005 036 367
Aug. 11, 2005 (DE) .......................... 10 2005 037 966

(51) Int. Cl.
*G21C 7/00* (2006.01)

(52) U.S. Cl. ........ 376/333; 376/327; 376/335; 376/332; 376/339

(58) Field of Classification Search .................. 376/327, 376/333, 447, 458, 459, 332, 339, 335
See application file for complete search history.

(56) References Cited

U.S. PATENT DOCUMENTS

| | | | |
|---|---|---|---|
| 2,941,933 A | 6/1960 | Roake et al. | |
| 3,261,756 A | 7/1966 | Ripley | |
| 4,172,762 A | 10/1979 | Anthony et al. | |
| 4,235,673 A * | 11/1980 | Mordarski | 376/327 |
| 4,640,813 A * | 2/1987 | Doshi et al. | 376/327 |
| 5,225,151 A * | 7/1993 | Bernander et al. | 376/333 |
| 5,684,847 A | 11/1997 | DeFoort et al. | |
| 5,742,655 A * | 4/1998 | Hertz et al. | 376/333 |
| 6,721,382 B1 | 4/2004 | Eriksson | |

FOREIGN PATENT DOCUMENTS

| | | |
|---|---|---|
| DE | 29 00 801 C2 | 7/1979 |
| DE | 198 34 041 A1 | 2/2000 |
| DE | 199 08 195 C1 | 2/2000 |
| EP | 0 296 954 A1 | 12/1988 |
| EP | 0 945 875 A1 | 9/1999 |
| FR | 2570213 A * | 3/1986 |
| JP | 1-123195 A | 5/1989 |

(Continued)

OTHER PUBLICATIONS

Merriam-Webster's Collegiate Dicitonary, tenth Edition (1999), p. 1267.*

*Primary Examiner* — Erin M Leach
(74) *Attorney, Agent, or Firm* — Laurence A. Greenberg; Werner H. Stemer; Ralph E. Locher

(57) ABSTRACT

A control rod for a pressurized-water nuclear reactor contains an absorber rod which is arranged in a casing tube. At least in a lower section, the absorber rod is provided with at least one recess which takes up at most a portion of the circumferential surface of this section. This reduces problems associated with an expansion in the volume of the absorber rod.

2 Claims, 3 Drawing Sheets

FOREIGN PATENT DOCUMENTS

| | | |
|---|---|---|
| JP | 01134298 U | 9/1989 |
| JP | 1235895 A | 9/1989 |
| JP | 2201292 A | 8/1990 |
| JP | 05006397 U | 1/1993 |
| JP | 9511837 T | 11/1997 |
| JP | 2001108779 A | 4/2001 |
| JP | 2002214378 A | 7/2002 |
| WO | 00/02205 A1 | 1/2000 |

\* cited by examiner

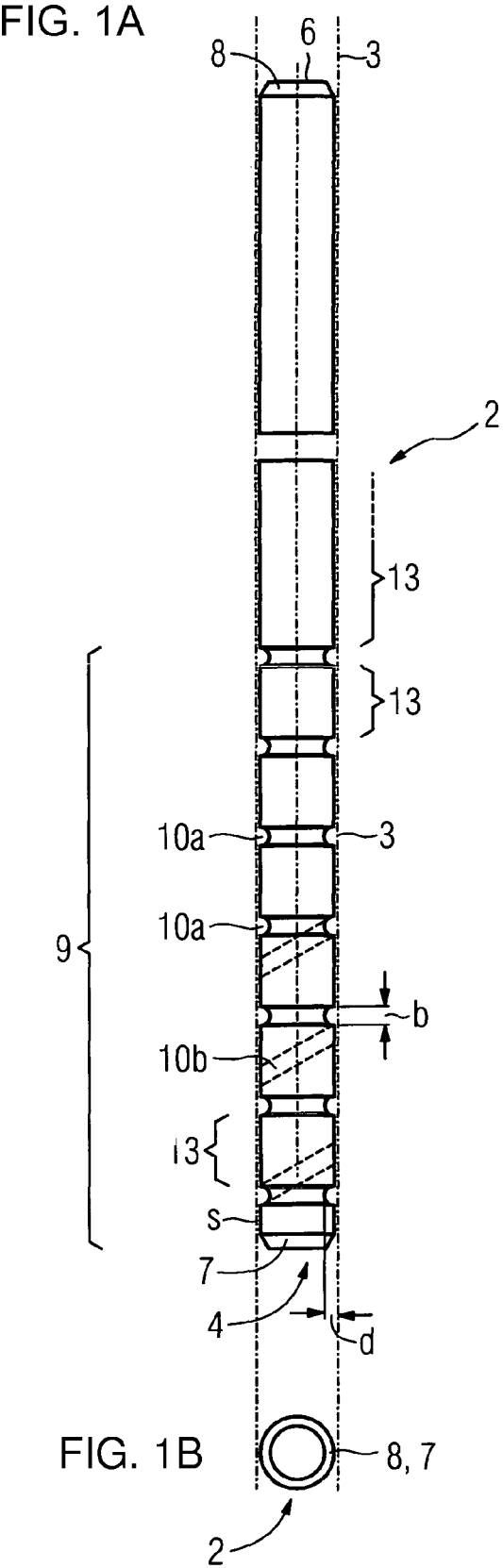
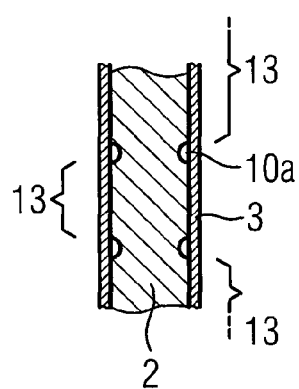
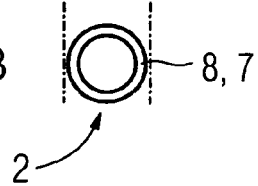

CONTROL ROD FOR A PRESSURIZED WATER NUCLEAR REACTOR

CROSS-REFERENCE TO RELATED APPLICATIONS

This is a continuation, under 35 U.S.C. §120, of copending international application No. PCT/EP2006/007225, filed Jul. 22, 2006, which designated the United States; this application also claims the priority, under 35 U.S.C. §119, of German patent applications DE 10 2005 036 367.9, filed Jul. 29, 2005 and DE 10 2005 037 966.4, filed Aug. 11, 2005; the prior applications are herewith incorporated by reference in their entirety.

BACKGROUND OF THE INVENTION

Field of the Invention

The invention relates to a control rod for a pressurized water nuclear reactor.

The control rod of a pressurized water nuclear reactor essentially consists of a cylindrical sheathing tube in which a cylindrical absorber rod is placed. The sheathing tube is sealed tight toward the outside and filled with a gas such as a noble gas, the filling pressure of which is a maximum of 1.5 bar at room temperature. In the process of operating, in areas with high neutron flux density, i.e. especially in a lower area of the control rod, a volume enlargement of the absorber rod takes place, caused by neutron absorption. This volume enlargement, designated as swelling, and increasing with operational duration, can lead to a radial stretching of the sheathing tube in this area, and in an unfavorable instance to damage to it, so that the control rod has to be replaced well before the end of its computed service life, i.e. at a time when it still has a sufficient neutron-absorbing effect.

For reasons having to do with manufacturing techniques, control rods are produced with a diametric gap of about 100 µm between the absorber rods and the sheathing tube, which is the reference design. During operation of control rods, the existing gap is reduced by the sheathing tube creeping downwards, i.e., by a reduction of the diameter of the sheathing tube caused by neutron irradiation and excess pressure, and by swelling of the absorber rod.

To reduce the problems mentioned initially, that go along with swelling of the absorber rod that occurs in pronounced fashion in the lower area, and delay closing of the gap, it is known in the state of the art to reduce the diameter of the absorber rod in a lower section to a length of up to about 350 mm, so that there the annular gap increased by an additional 130 µm diametrically. By this means a free space is made available, into which the absorber rod can extend. However, with this measure also, a satisfactory reduction of the stretching of the sheathing tube accompanying the swelling of the absorber rod could not be achieved.

BRIEF SUMMARY OF THE INVENTION

It is accordingly an object of the invention to provide a control rod for a pressurized water reactor which overcomes the above-mentioned disadvantages of the heretofore-known devices and methods of this general type and which provides for a control rod in which the degree of sheathing tube stretching caused by swelling of the absorber rod is lessened.

With the foregoing and other objects in view there is provided, in accordance with the invention, a control rod for a compressed water nuclear reactor, comprising:

an absorber rod disposed in a sheathing tube, said absorber rod having a lower section with a circumferential surface;

the absorber rod being formed with a recess, at least in the lower section and on at most one part of the circumferential surface, to form a free space within the sheathing tube surrounding the absorber rod.

In other words, the objects of the invention are achieved in that the control rod has an absorber rod that is placed in a sheathing tube and which, at least in a lower section, is formed with at least one recess, that at most occupies one part of the circumferential area of that section.

In this the invention is based on the knowledge that the expanded gap that is known in the state of the art, and that extends over the entire circumference and over a larger section in the lower part, is linked to significant reduction in heat transmission from the absorber rod to the sheathing tube, and from it to the cooling water, so that in this section the absorber rod becomes considerably more heated. This leads to greater deformation of the absorber rod, which is caused by axial forces acting on the absorber rod when the control rods are in motion, due to great acceleration. This increase in creep deformation is designated as slumping and leads to rapid reduction in the free space obtained, so that it no longer is available, or only partially so, to admit the absorption rod that has swollen due to neutron absorption.

According to the invention, not only is a recess made available within the hollow cylindrical sheathing tube that surrounds the absorber rod, into which the swelling absorber can penetrate due to a plastic deformation resulting from the swelling, but also care is taken that in this section the absorber rod is provided with recesses on at most a part of its circumferential surface, i.e., in this section it has no gap that is larger than the reference design. Therefore it is ensured that despite creation of a recess, sufficient heat can be transported outward. In this way, in this area the temperature rises in the absorber only to a negligible degree, so that the increase in creep deformation associated with such a temperature rise plays virtually no role, and the free space produced resulting from the recess is markedly overcompensated. In addition, by creation of a recess, the surface of the absorber rod is increased, and thus its effectiveness is improved.

Owing to these measures, the risk of having to replace the control rod well before the end of its calculated service life is reduced.

The recess can be formed by a screwlike groove running around on the outer circumference, by an annular groove, by a longitudual groove running along the outer surface of the absorber rod, or by a borehole extending in the axial direction. These design measures can be undertaken either individually or in combination with each other.

If, in addition, the control rod is filled with a noble gas, preferably Helium He, the filling pressure at room temperature is measured at greater than 1.5 bar, and especially greater than 10 bar, then owing to the improved heat transmission that accompanies this, the temperature rise in the absorber material in the area of the recess is additionally reduced. Additionally, due to a higher filling pressure, the downward creep, mentioned above, of the sheathing tube is lessened, since the filling pressure acts counter to external pressure. In this it has been shown that even with an increase in filling pressure to about 50 bar, one can expect service life to be increased by an additional 2 to 4 operating cycles.

Other features which are considered as characteristic for the invention are set forth in the appended claims.

Although the invention is illustrated and described herein as embodied in control water for a pressurized water nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1A is a side view of an absorber rod according to the invention;

FIG. 1B is an end view of one of its ends;

FIG. 2 is a partial longitudinal section taken through a control rod with an absorber rod according to FIGS. 1A and 1B;

DETAILED DESCRIPTION OF THE INVENTION

Figure 3A:
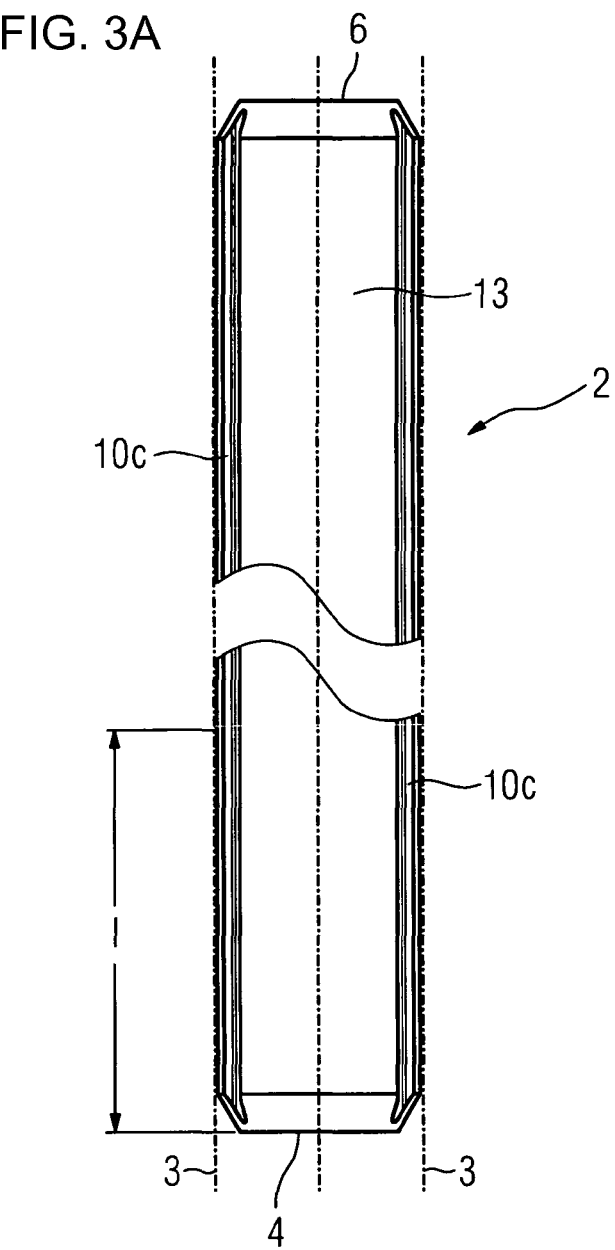
FIG. 3A is a side view of an exemplary embodiment of an absorber rod according to the invention.

Referring now to the figures of the drawing in detail and first, particularly, to FIG. 1 thereof, an absorber rod 2 has an essentially cylindrical shape. At its lower and upper ends 4 and 6 it is conically shaped, i.e., provided with a beveled edge 7 and 8, respectively. The absorber rod 2, that can be composed axially of a multiplicity of partial rods, is placed in a sheathing tube 3 that is indicated in the figure by a dash-and-dot line, by which it is surrounded in gas-sealed fashion. By "lower end" what is meant is the end of absorber rod 2 with it, in its installed state and in operation, is inserted, together with the sheathing tube 3 into a control rode guide tube of a burner.

In a lower section 9 that adjoins this conical section 7, the absorber rod 2 is formed with a multiplicity of recesses in the form of annular flutes or grooves 10a. In the area of these recesses, the absorber rod 2 thus has a cross sectional surface perpendicular to its long axis that is markedly smaller than the cross sectional surface perpendicular to the long axis of the cylindrical sheathing tube 3 shown with dots and dashes in the figure. In one area 13 between the grooves 10a or adjoining the grooves 10a, the absorber rod 2 has a cylindrical shape and there has a diameter only slightly less than the diameter of the sheathing tube 3, so that in this area 13, only a small gap s, barely visible in the figure, to the sheathing tube 3 exists, on the order of magnitude of about 100 μm. In other words, only in a partial section of the circumferential surface of lower section 9 is the absorber rod 2 provided with recesses. In the exemplary embodiment, a depth d of the grooves is about 1 mm, and their width b is about 2 mm, so that with the seven grooves that are each at a distance of about 1 cm from each other, a free space results with a volume on the order of magnitude of about 270 mm$^3$. Into this free space, the swelling absorber rod 2 can extend without leading to a stretching of the sheathing tube 3.

In addition, it can be gleaned from FIG. 1A that the surface on which the absorber rod 2 in section 9 is in contact with the sheathing tube when installed, is only slightly reduced, only by about 10-20% in the exemplary embodiment.

Instead of annular grooves 10a, screwlike grooves 10b can also be provided, as is shown in the figure by dashes.

FIG. 2 now shows a section from a control rod, in the sheathed tube 3 of which absorber rod 2 according to FIG. 1A, 1B is shown. It can clearly be seen that between the absorber rod 2 and the inner surface of sheathing tube 3, in its areas 13 adjoining the grooves, only a small gap exists, so that heat transport there is good.

Figure 3B:
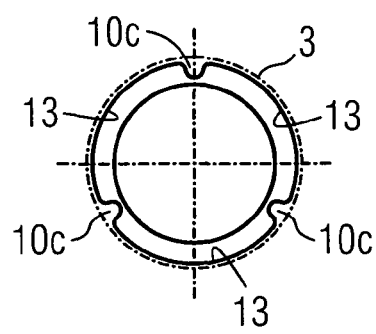
FIG. 3B is an end view thereof.

In the embodiment according to FIGS. 3A and 3B, the recess is formed by a multiplicity of longitudinal grooves 10c running in the axial direction, that extend in the depicted exemplary embodiment over the entire length of the absorber rod 2, so that the absorber rod 2 is symmetrical, and the lower and upper ends 4, 6 can be exchanged. It has been shown in practice that it suffices if the longitudinal grooves 10c extend from the lower end 4 over a length/of about 100-300 mm, since it is only in this area that the neutron loading is very great and results in a pronounced swelling. Between the longitudinal grooves 10c are the areas 13 in which only a small gap exists between the absorber rod 2 and the sheathing tube 3.

Figure 4A:
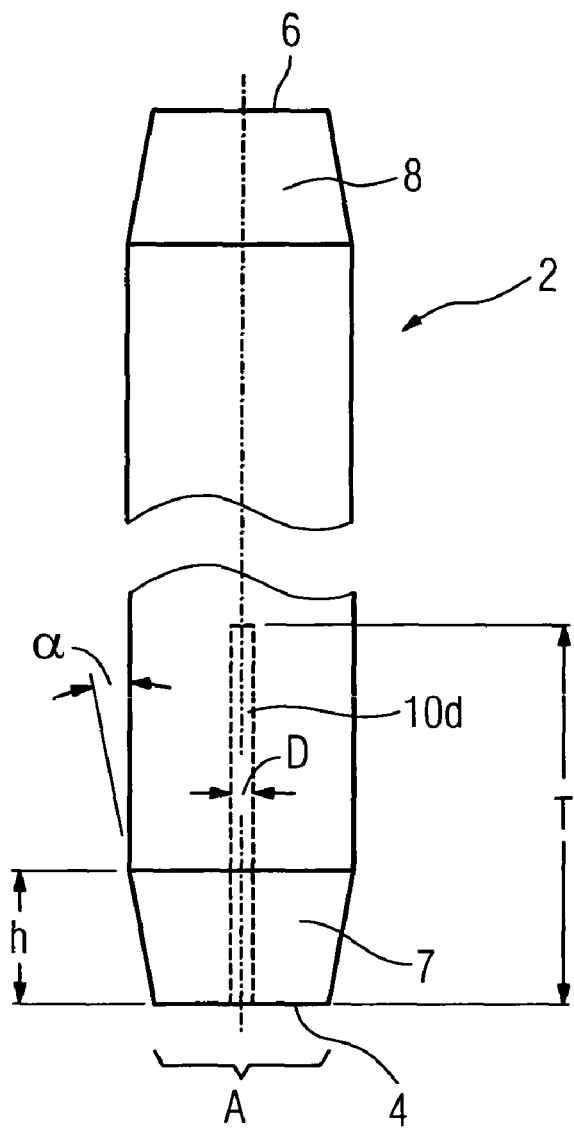
FIG. 4A is a side view of an alternative embodiment of the absorber rod according to the invention.
Figure 4B:
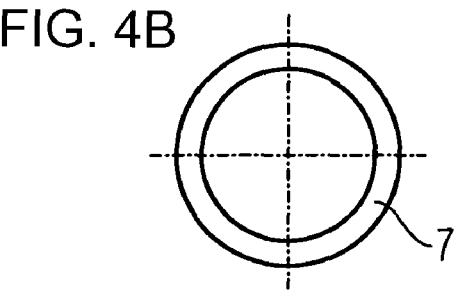
FIG. 4B is an end view thereof.

In the embodiment form according to FIGS. 4A and 4B, the conical areas or the beveled edges 7, 8 are modified by a reduction in the bevel angle α to values between 2° and 30° as well as by an increase in the length h of beveled edges 7, 8, i.e., the height of the conical area is altered to values greater than 1 mm. In this way, an increased free space is created into which the absorber material can swell. The bevel angle α is reduced and at the same time the height h of the conical area is increased. Therefore, the free space produced by these beveled edges 7, 8 can be increased while the front part A of absorber rod 2 remains the same. In this case also, it is sufficient to only modify one of the bevels 7, 8. If only one bevel is modified, for example bevel 7, the lower end 4 of the absorber rod 2 is determined. In other words: the absorber rod can then be placed only in one direction in the sheathing tube of the control rod.

Additionally in the figure, at the lower end, a recess is made in the form of a central axial borehole 10d, which likewise serves as a free space and can be implemented in addition to, or alternatively to, the measures explained above and below. Typically such a borehole 10d has a diameter D of about 3 mm and a depth T of about 50-100 mm. If such a borehole 10d is made, care must be taken that the front part A, which simultaneously is the contact surface for absorber rod 2 on an interior surface of the sheathing tube, is not reduced by an appropriate configuration of the bevel 7.

The measure depicted in FIG. 4A, 4B can be used also in combination with the grooves 10a, 10b running around as depicted in FIGS. 1A, 1B, or the longitudinal grooves 10d depicted in FIGS. 3A, 3B. Instead of the grooves, flutings or axial borehole shown, recesses can also be provided with other geometric forms, such as trough-shaped indentations or holes. The only thing that is primarily important is that additional free space results, into which the absorber rod can swell, and that they occupy at most a part of the circumferential surface of the lower section.

The invention claimed is:

1. A control rod for a pressurized water nuclear reactor, comprising:

an absorber rod disposed in a sheathing tube, said sheathing tube surrounding said absorber rod in a gas-sealed manner, said absorber rod having a lower section with a circumferential surface;

said absorber rod being formed with at least one recess in said lower section occupying at most only a part of said circumferential surface, to define a free space within said sheathing tube, said at least one recess being a longitudinal groove running on an outer peripheral surface in an axial direction of said absorber rod, said circumferential surface having a surface area adjoining said groove, said surface area of said circumferential surface being spaced from said sheathing tube for defining a gap between said surface area and said sheathing tube.

2. The control rod according to claim 1, which further comprises a noble gas filling the control rod with a filling pressure, measured at room temperature, greater than 1.5 bar.

* * * * *